(12) United States Patent
Pieronek et al.

(10) Patent No.: US 11,577,300 B2
(45) Date of Patent: Feb. 14, 2023

(54) METHOD AND DEVICE FOR PRODUCING A WHEEL RIM

(71) Applicants: ThyssenKrupp Steel Europe AG, Duisburg (DE); thyssenkrupp AG, Essen (DE)

(72) Inventors: David Pieronek, Dortmund (DE); Jorg Gorschluter, Dortmund (DE)

(73) Assignee: thyssenkrupp AG, Essen (DE)

( * ) Notice: Subject to any disclaimer, the term of this patent is extended or adjusted under 35 U.S.C. 154(b) by 0 days.

(21) Appl. No.: 17/047,847

(22) PCT Filed: Apr. 11, 2019

(86) PCT No.: PCT/EP2019/059188
§ 371 (c)(1),
(2) Date: Oct. 15, 2020

(87) PCT Pub. No.: WO2019/201722
PCT Pub. Date: Oct. 24, 2019

(65) Prior Publication Data
US 2021/0107052 A1    Apr. 15, 2021

(30) Foreign Application Priority Data

Apr. 17, 2018   (DE) .......................... 102018205772.9

(51) Int. Cl.
*B21D 53/30* (2006.01)
*B21D 22/02* (2006.01)
*B60B 21/00* (2006.01)

(52) U.S. Cl.
CPC .......... *B21D 53/30* (2013.01); *B21D 22/022* (2013.01); *B60B 21/00* (2013.01); *B60B 2310/208* (2013.01); *B60B 2310/30* (2013.01); *B60B 2360/102* (2013.01)

(58) Field of Classification Search
CPC ...... B21D 22/022; B21D 53/30; B60B 21/00; B60B 2310/208; B60B 2310/30; B60B 2360/102; C21D 1/673; C21D 9/34
See application file for complete search history.

(56) References Cited

U.S. PATENT DOCUMENTS

| | | | |
|---|---|---|---|
| 2,649,886 A | 8/1953 | Palmer | |
| 3,907,371 A * | 9/1975 | Luedi | B21D 26/033 |
| | | | 301/95.101 |
| 2004/0041458 A1* | 3/2004 | Shin | B60B 3/04 |
| | | | 301/5.1 |

(Continued)

FOREIGN PATENT DOCUMENTS

| | | |
|---|---|---|
| CN | 103506487 A | 1/2014 |
| CN | 104540612 A | 4/2015 |

(Continued)

OTHER PUBLICATIONS

Machine Translation for WO-2014024907-A1 (Year: 2014).*

(Continued)

*Primary Examiner* — David P Bryant
*Assistant Examiner* — Christine Bersabal
(74) *Attorney, Agent, or Firm* — RMCK Law Group PLC

(57) ABSTRACT

The present invention relates to a method and to a device (10) for producing a wheel rim (1) for a vehicle wheel (3), and to a method for producing a vehicle wheel (3).

11 Claims, 5 Drawing Sheets

(56) References Cited

U.S. PATENT DOCUMENTS

2016/0318091 A1    11/2016   Marx et al.
2021/0107051 A1*    4/2021   Saylor ....................... B60B 3/10

FOREIGN PATENT DOCUMENTS

| CN | 106903232 A | | 6/2017 | |
|---|---|---|---|---|
| CN | 107052720 A | * | 8/2017 | ........... B21D 22/022 |
| CN | 107052720 A | | 8/2017 | |
| DE | 102007019485 A1 | | 11/2008 | |
| DE | 102013114245 | | 5/2015 | |
| DE | 102014108901 | | 10/2015 | |
| DE | 102014108901 B3 | * | 10/2015 | ........... B21D 22/022 |
| FR | 2335284 A1 | | 7/1977 | |
| GB | 1277354 A | * | 4/1971 | ............... B63H 5/14 |
| WO | 2014024907 A1 | | 2/2014 | |
| WO | WO-2014024907 A1 | * | 2/2014 | ............. B21D 53/30 |

OTHER PUBLICATIONS

Machine Translation for DE-102014108901-B3 (Year: 2015).*
Machine Translation for CN107052720A (Year: 2017).*
International Search Report and Written Opinion for International Application No. PCT/EP2019/059188 dated Aug. 30, 2019 with English translation.
Search Report of First Chinese Office Action for CN Application No. 2019800266326 dated Dec. 20, 2021.
Henning, F. et al., "Handbuch Leichtbau", Beijing Institute of Technology Press, Jul. 2022.
Second Chinese Office Action for CN Application No. 2019800266326 dated Jul. 19, 2022.

* cited by examiner

METHOD AND DEVICE FOR PRODUCING A WHEEL RIM

CROSS-REFERENCE TO RELATED APPLICATIONS

This application is a 371 U.S. National Stage of International Application No. PCT/EP2019/059188, filed Apr. 11, 2019. The disclosure of the above application is incorporated herein by reference in its entirety.

The invention relates to a method and to a device for producing a wheel rim for a vehicle wheel, and to a method for producing a vehicle wheel.

TECHNICAL BACKGROUND

Vehicle wheels or motor vehicle wheels are safety-critical components and must therefore be able to endure high mechanical and dynamic alternating stresses during driving. Conventional "steel wheels" of sheet-metal construction generally consist of a wheel disk, which ensures the connection to the wheel hub, and a wheel rim (rim strip), which accepts the tire. Nowadays, the wheel components are manufactured in several steps (up to eleven steps) on progressive presses by cold forming (deep drawing, flow forming, profiling). In this case, use has been made hitherto exclusively of micro-alloyed steels (structural steel, fine-grained steel) and dual-phase steels with a strength of 400 to 600 MPa. MAG welding in combination with press joining (drop center rim) is preferably provided as a joining technique.

As a mass that is moved in rotation, the weight of the vehicle wheels has a disproportionate effect on the energy consumption of the vehicles and additionally also on the unsprung masses. The aim is therefore generally to achieve a vehicle wheel weight which is as low as possible with, ideally, a high stiffness. Particularly in the case of commercial vehicles with several wheels and a unit weight of about 36 to 40 kg, a significant reduction in weight also has a positive effect on the payload. As compared with conventionally produced vehicle wheels, it is possible to exploit additional potential for lightweight construction with steel if, on the one hand, material with a higher strength or vibration resistance is used for reliable absorption of the operating loads and, on the other hand, geometric modifications, e.g. embossed features to compensate for losses of stiffness due to lower material thicknesses, can be implemented. With increasing material strength, however, there is generally also a decrease in the cold formability of conventional steels (carbon steel), and this has already been almost exhausted with current wheel disks. Thus, lightweight construction with cold-formable and higher-strength steels is reaching its technical limits on the basis of current manufacturing concepts for wheels. Apart from the weight of the wheels, design also plays a significant role in the case of passenger vehicles. The freedom of design and attractiveness of known steel wheels is therefore likewise severely restricted with conventional modes of construction and materials.

Apart from what is referred to as cold forming, other techniques used in vehicle body construction also include what is referred to as hot forming, also known among experts as indirect or direct hot forming. By using hot forming, it is possible to satisfy the requirement for a high degree of formability with, at the same time, high strengths of the fully formed components. Corresponding forming methods that include a prior heat treatment of the workpiece, e.g. in a separate furnace, in particular hot forming and press hardening of steel sheet, are sufficiently well known from the prior art. However, the use of hot forming for sheet-steel components subjected primarily to cyclical loads, e.g. control arms, wheels, axle beams, has not hitherto become established in motor vehicle construction.

As the prior art for the hot sheet forming of passenger vehicle wheels or the corresponding wheel disks, which can be press hardened, at least in some region or regions, reference is made to documents DE 10 2007 019 485 A1, DE 10 2013 114 245 B3 and DE 10 2014 108 901 B3. The focus of these documents is mainly on the local mechanical component properties of the wheel disks after hot forming or press hardening and corresponding method steps or devices for the production of wheel disks for standard steel wheels.

Hardening of a wheel rim, at least in some region or regions, on the assembled wheel is disclosed in US Published Application US 2004/0041458 A1, with the aim of increasing the resistance of the wheel in the case of a collision with a curb or in the case of a shock load. In the case of a standard wheel for passenger vehicles, the mass is predominantly concentrated in the wheel rim (> about 60%), and therefore an increase in the material strength in the wheel rim not only has a positive effect on resistance in the case of shock loading but, given appropriate design, can also allow a reduction in the rim weight, which is desirable especially in the case of commercial vehicle wheels. Local hardening of the wheel in accordance with the proposed method from US 2004/0041458 A1 is disadvantageous inasmuch as the procedure would lead to extreme distortion of the component, which has an unfavorable effect on dimensional accuracy and the truth of running of the wheel.

A standardized wheel rim is of rotationally symmetrical and/or annular construction and has geometrical areas that are undercut, particularly around the axis of rotation of the wheel, on the rim flange and/or the bead seat (hump, valve seat), making production by direct hot forming technically difficult to implement. Owing to the complex geometry of the wheel rim, it must furthermore be assumed that hot forming with the known tool components (punch, sheet holder, die) is not conducive to the aim.

SUMMARY OF THE INVENTION

It is thus the underlying object of the invention to specify a suitable method and a corresponding device for producing hot-formed or press-hardened wheel rims from steel sheet and a method for producing a vehicle wheel which ensure a large reduction in weight, and high dimensional accuracy, operational strength and safety, in particular with acceptable manufacturing costs.

This object is achieved by a method having the features of patent claim 1.

According to a first teaching, the invention relates to a method for producing a wheel rim for a vehicle wheel, comprising the following steps: providing a semifinished product made of steel sheet, producing a rotationally symmetrical and/or tubular and/or near-final-contour preform of a wheel rim from the semifinished product, at least partial or complete heating of the preform of the wheel rim to a temperature of at least $A_{C1}$ and subsequent hot forming, at least in some region or regions, with at least partial press hardening, wherein the hot forming, at least in some region or regions, with at least partial press hardening is carried out in a device, wherein the device comprises at least two inner dies and at least two outer dies, wherein, at least in some region or regions, the inner dies each have an effective area which, at least in some region or regions, corresponds to the corresponding final geometry of the inner contour of the wheel rim, wherein, at least in some region or regions, the outer dies have an effective area which, at least in some region or regions, corresponds to the corresponding final geometry of the outer contour of the wheel rim, wherein the hot preform is arranged between the outer dies, and, by the action of the effective areas of the outer dies on the outer contour of the preform of the wheel rim, the preform of the wheel rim is converted into the final geometry of the outer contour of the wheel rim, hot formed, at least in some region or regions, and at least partially press hardened.

According to the invention, a rotationally symmetrical and/or tubular and/or near-final-contour preform of a wheel rim, which is or has been produced from a semifinished product made of steel sheet, is heated or heated through at least partially or completely to a temperature of at least $A_{C1}$, preferably to a temperature of at least $A_{C3}$, and, at least in some region or regions, is then hot formed and at least partially press hardened in a device. The at least partial press hardening, in particular the tool contact, gives rise at least partially in the wheel rim to a hardened structure by means of which a high dimensional accuracy can be achieved through the avoidance of springback, especially since, at least in some region or regions, the inner dies each have an effective area which, at least in some region or regions, corresponds to the corresponding final geometry of the inner contour, and, at least in some region or regions, the outer dies each have an effective area which, at least in some region or regions, corresponds to the corresponding final geometry of the outer contour of the wheel rim, wherein the hot preform is arranged between the outer dies, and, in particular by the action of the effective areas of the outer dies on the outer contour of the preform of the wheel rim, the preform of the wheel rim is converted into the final geometry of the outer contour of the wheel rim. It is thereby possible to improve the dimensional accuracy of the wheel rim in the device, thus making it possible to reduce or completely circumvent expensive finishing work, e.g. to compensate the concentricity deviations. With appropriate implementation, the at least partially produced hardened structure in the wheel rim leads to a higher operational strength of the wheel rim, which allows a significant reduction in the weight of a wheel as a whole. Moreover, the resistance of the wheel rim in the case of a shock load can be increased.

According to one embodiment of the method, before, during or after the action of the effective areas of the outer dies on the outer contour of the preform of the wheel rim, the effective areas of the inner dies acts on the inner contour of the preform of the wheel rim, wherein the preform of the wheel rim is in contact, at least in some region or regions, with the effective areas of the inner dies and outer dies in the closed state of the device. This gives rise at least partially to a hardened structure in the wheel rim, which can contribute to further improvement of dimensional accuracy since the at least partially produced hardened structure leads to higher operational strength of the wheel rim, which allows a further reduction in the weight of a wheel as a whole. By virtue of the bilateral tool contact of the preform of the wheel rim with the inner die and the outer die, heat dissipation via the tool or device can be achieved in a particularly efficient way, and the manufacturing process or process time can thereby be optimized.

According to one embodiment of the method, during the arrangement of the hot preform of the wheel rim between the outer dies, at least one of the inner dies is arranged between the outer dies, and the hot preform is placed over the at least one inner die, at least in some section or sections.

According to one embodiment of the method, the device comprises two inner dies, and, after the arrangement of the hot preform of the wheel rim, the second inner die is moved in translation in the direction of the first inner die, wherein, in the closed state of the device, the preform of the wheel rim is in contact, at least in some region or regions, with the effective areas of the two inner dies. In particular, the effective areas of the inner dies can serve as a kind of counter bearing, especially if the effective areas of the outer dies act on the outer contour of the preform of the wheel rim and thereby accommodate between them the wheel rim and a certain dimensional accuracy can be established in the wheel rim by at least partial press hardening. It is thereby possible to improve the dimensional accuracy of the wheel rim, thus making it possible to reduce or completely circumvent expensive finishing work, e.g. to compensate the concentricity deviations. The translational movement preferably takes place parallel to the axis of rotation of the preform of the wheel rim or of the (final geometry of the) wheel rim. The first or the second inner die are/is embodied in such a way as to be movable in translation, wherein the respective other inner die can be of rigid design and hence the device can be constructed with fewer moving tool components and thus the device can be of less complex design, or, if required, both inner dies can be embodied in such a way as to be movable in translation. A particularly efficient manufacturing process can thereby be achieved.

According to an alternative embodiment of the method, the device comprises at least two inner dies, wherein the inner dies can be moved in translation from a first position into a second position, wherein the circumference of the effective areas of the inner dies is smaller in the first position than in the second position, wherein the inner dies are in the first position during the arrangement of the hot preform of the wheel rim, wherein, after the arrangement of the hot preform of the wheel rim, the inner dies are moved into the second position, and, in the closed state of the device, the preform of the wheel rim is in contact, at least in some region or regions, with the effective areas of the two inner dies. The two or more inner dies are arranged within the device between the outer dies, wherein the translational movement preferably takes place radially with respect to the axis of rotation of the preform of the wheel rim or of the (final geometry of the) wheel rim. The inner dies are as it were embodied in a segmented way and, in accordance with their number, act in corresponding fashion by means of their effective areas on the inner contour of the preform of the wheel rim, wherein it is also possible to provide three, four or more inner dies, depending on the size and use of the wheel rim. In particular, the translational movement of the inner dies into the second position takes place at the same time as and/or with a time offset with respect to the translational movement and coming together of the outer dies in order, at least in some region or regions, to make contact with and accommodate the preform of the wheel rim between the effective areas. As a preferred possibility, optimum dimensional accuracy of the wheel rim can be effected by a simultaneous action. By means of the method according to the invention, it is also possible to bring undercut regions of the wheel rim into engagement or contact with the inner and outer die and thus to carry out at least partial press hardening.

According to one embodiment of the method, at least one region on the wheel rim is not press hardened. Press hardening preferably does not take place in the region which is used, in particular, for the at least substance-to-substance bonding to a wheel disk, in order, when producing a vehicle wheel, particularly during substance-to-substance joining, preferably during welding of the wheel disk to the wheel rim, to avoid the formation of a softening zone or to reduce softening in the heat-affected zone, which would form if there were a hardened structure and would define a metallurgical notch that would no longer be able to ensure adequate operational strength and/or stability of the wheel as a whole. Moreover, it may be advantageous to provide a certain ductility in the region of attachment of the wheel rim since the wheel disk is preferably pressed in, which, in the event of too little local deformability, could entail pre-damage, which is unwanted.

According to one embodiment, a hardenable steel material with a carbon content of at least 0.07% by weight, in particular of at least 0.10% by weight, preferably of at least 0.15% by weight, particularly preferably of at least 0.22% by weight, is provided as the semifinished product.

Vibration resistance tests by the inventor have shown that hardenable steel materials with a predominantly martensitic and/or bainitic microstructure, e.g. manganese-boron, heat-treated and air- and oil-hardening steels, have a significantly increased cyclical alternating bending strength as compared with the conventionally used dual-phase and micro-alloyed steels and thus, in principle, allow additional lightweight construction through a reduction in sheet thickness, particularly of the motor vehicle wheel rim. The steel material provided can be a case hardened steel or heat-treated steel, in particular C10, C15, C22, C35, C45 or 42 CrMo4, a steel containing manganese, in particular 8 MnCrB3, 16 MnB5, 16 MnCr5, 22 MnB5 or 37 MnB5, an air-hardening steel, an oil-hardening steel or a multilayer steel composition material, e.g. with three layers of steel, of which at least one is hardenable.

At the temperature $A_{C1}$, the structure begins to be converted into austenite and, in particular, is in a fully austenitic form when the temperature $A_{C3}$ is exceeded. The preform of the wheel rim is preferably heated to a temperature of at least $A_{C3}$, with the result that there is a substantially austenitic structure in the entire component. $A_{C1}$ and $A_{C3}$ are characteristic values which are dependent on the composition (alloying components) of the steel material used and can be taken from what are referred to as TTA and TTT diagrams. The at least partial press hardening preferably takes place in a device in which the hot forming is carried out, at least in some region or regions, wherein the device is, in particular, actively cooled in at least one region in which the press hardening is to be implemented, with the result that rapid cooling is effected by contact with the tool part, in particular with the wheel rim/effective area thereof, in order to convert austenite into a hard structure, which may, in particular, predominantly comprise martensite and/or bainite ($M_f$-martensite finish). The required cooling rates can likewise be taken from the TTT diagrams, depending on the desired structure.

Hot forming at least in some region or regions should be interpreted to mean, in particular, shaping of the preform of the wheel rim to the desired final geometry (target geometry) of the wheel rim and/or sizing to improve dimensional accuracy or compliance with tolerances. In combination with at least partial press hardening, a final component with final mechanical properties and an at least in part predominantly martensitic and/or bainitic microstructure of the wheel rim is provided. If required, the wheel rim may also be completely press hardened. A predominantly martensitic or bainitic microstructure presupposes a minimum proportion of the structural phase of 50%, individually or in combination.

In particular, the rotationally symmetrical and/or tubular and/or near-final contour preform of the wheel rim is produced from a semifinished product, e.g. from a flat sheet metal blank made of a hardenable steel material. By means of cold forming, e.g. by means of tool components moved in rotation, e.g. by means of flow forming, profiling etc., a preform of the wheel rim, preferably an at least near-final contour rim well and/or hump and/or bead seat and/or rim flange, can be provided. "Outer contour" of the preform of the wheel rim or of the (final geometry of the) wheel rim should be interpreted to mean the outer geometry of the rim flange, at least in some section or sections, particularly the outer geometry of the rim flange and/or of the bead seat in some section or sections, preferably the outer geometry of the rim flange, of the bead seat and/or of the hump in some section or sections, particularly preferably the outer geometry of the rim flange, or of the bead seat, or of the hump and/or of the rim well in some section or sections, which, in particular, is no longer visible in the state of use of a mounted tire. "Inner contour" of the preform of the wheel rim or of the (final geometry of the) wheel rim should be interpreted to mean the inner geometry of the rim flange, at least in some section or sections, particularly the inner geometry of the rim flange and/or of the bead seat in some section or sections, preferably the inner geometry of the rim flange, of the bead seat and/or of the hump in some section or sections, particularly preferably the inner geometry of the rim flange, or of the bead seat, or of the hump and/or of the rim well in some section or sections, which is visible at least in some region or regions, in particular even in the state of use and is in direct contact with a wheel disk.

According to one embodiment of the method, the at least partial press hardening of the preform of the wheel rim is additionally assisted by the use of a fluid, which is brought into direct contact with the hot preform. It is thereby possible, for example, for regions on the wheel rim which, owing to their geometry, e.g. in the case of an undercut geometry, cannot undergo tool contact for at least partial press hardening, additionally to be brought into contact with a fluid in order to ensure cooling and thus the establishment of a hardened structure, even at least partially, in those regions which do not come into contact with the components of the device. Moreover, it is precisely the hardenability of components with greater sheet-metal thicknesses that can be improved through the higher heat transfer when using cooling by means of a fluid.

According to a second teaching, the invention relates to a method for producing a vehicle wheel, wherein a wheel disk and a wheel rim produced according to the invention are provided, wherein the wheel disk is attached to the wheel rim by substance-to-substance bonding, nonpositive engagement and/or positive engagement. In order to avoid repetitions, attention is drawn to the advantageous embodiments relating to the production of the wheel rim.

According to one embodiment, a wheel disk is provided which is produced from a semifinished product made of steel sheet, by cold forming and/or hot forming with at least partial press hardening.

According to one embodiment, the wheel disk preferably has a material thickness of up to a maximum of 6 mm for the production of a wheel for passenger vehicles, preferably or a material thickness of more than 6 mm, in particular of more than 8 mm, for the production of a wheel for commercial vehicles, which can be justified by the higher wheel loads. In other embodiments, particularly deviations from the abovementioned material thicknesses are conceivable, depending on the design and vehicle type, e.g. agricultural machines or agricultural vehicles or military vehicles.

According to one embodiment, the wheel rim preferably has a material thickness of up to a maximum of 3 mm for the production of a wheel for passenger vehicles, or, in particular, a material thickness of more than 3 mm for the production of a wheel for commercial vehicles, which can be justified by the higher wheel loads. Particularly deviations from the abovementioned material thicknesses are conceivable in other embodiments, depending on the design and vehicle type.

According to a third teaching, the invention relates to a device for producing a wheel rim for a vehicle wheel, in particular for carrying out the method according to the first teaching, having at least two inner dies, wherein, at least in some region or regions, the inner dies each have an effective area which, at least in some region or regions, corresponds to the corresponding final geometry of the inner contour of the wheel rim, and at least two outer dies, wherein, at least in some region or regions, the outer dies have an effective area which, at least in some region or regions, corresponds to the corresponding final geometry of the outer contour of the wheel rim, wherein a hot preform of a wheel rim can be arranged between the outer dies, wherein by the action of the effective areas of the outer dies on the outer contour of the preform of the wheel rim, the hot preform of the wheel rim can be converted into the final geometry of the outer contour of the wheel rim, hot formed, at least in some region or regions, and at least partially press hardened, wherein the at least two outer dies can be moved in translation and, when brought together, can accommodate the wheel rim along the outer contour thereof, at least in some region or regions.

According to the invention, it is possible, by means of the at least two outer dies of the device, which can be moved in translation, to accommodate the wheel rim along the outer contour thereof, at least in some region or regions, in particular substantially completely, when they are brought together, thus enabling at least the hot preform of the wheel rim to be hot formed, at least in some region or regions, in the device and to be at least partially press hardened, wherein, through the at least partial press hardening, in particular through the tool contact, there is formed at least partially in the wheel rim a hardened structure by means of which a high dimensional accuracy can be achieved through the avoidance of spring back, especially since, at least in some region or regions, the inner dies each have an effective area which, at least in some region or regions, corresponds to the corresponding final geometry of the inner contour of the wheel rim, and, at least in some region or regions, the outer dies each have an effective area which, at least in some region or regions, corresponds to the corresponding final geometry of the outer contour of the wheel rim, the hot preform of the wheel rim can be arranged between the outer dies, and, in particular by the action of the effective areas of the outer dies on the outer contour of the preform of the wheel rim, the preform of the wheel rim can be converted into the final geometry of the outer contour of the wheel rim.

The number of outer dies is not reduced to two. Depending on the size and use of the wheel rim or of the vehicle wheel to be produced, it is also possible to provide three, four or more than four outer dies, which can each be moved in translation and allow an effective area, designed to correspond to the outer contour of the wheel rim, to accommodate the wheel rim, at least in some region or regions. "Movable in translation" means that the outer dies can preferably be moved in and out radially in the direction of the wheel rim or radially with respect to the axis of rotation of the wheel rim, wherein, in particular, the axis of rotation of the wheel rim corresponds to the central point in the device, in particular for the movable embodiment of the outer dies.

According to one embodiment of the device, the device comprises two inner dies, wherein the first and/or the second inner die are/is embodied in such a way as to be movable in translation, and the translational movement can be performed parallel to the axis of rotation of the wheel rim or in the axial direction of the wheel rim. By means of this advantageous configuration, relatively simple process management and design of a corresponding device with few moving components is possible, which allow a particularly effective manufacturing process.

According to an alternative embodiment of the device, the device comprises two, preferably at least three, four or more than four inner dies, wherein the inner dies are embodied in such a way as to be movable in translation from a first position into a second position, and the translational movement can be performed radially with respect to the axis of rotation of the wheel rim. By virtue of the radial translational movement of the inner dies, it is also possible for undercut geometries of the wheel rim or undercut regions on a wheel rim to be cooled by means of tool contact. In particular, this makes it possible for the device to accommodate the wheel rim in the closed state, at least in some region or regions, in particular substantially completely, and to substantially prevent distortion of the component. Moreover, it is thereby possible, in particular, for the wheel rim to be press hardened substantially completely.

According to one embodiment of the device, the device comprises means for the active and/or passive cooling of the at least one inner die and/or of the at least one outer die and/or means for direct fluid supply. Active and/or passive cooling of the at least one inner die or of a region of the inner die and/or of the at least one outer die or of a region of the outer die can ensure continuous heat dissipation, with the result that the tool components do not heat up significantly and, as a result, it is possible to enable at least partial press hardening without disruptions in the process. Alternatively or cumulatively, means for direct fluid supply can also be provided, with the result that it is possible to enable sufficient hardening, e.g. in regions which are not in tool contact, in particular in the region of undercuts.

BRIEF DESCRIPTION OF THE DRAWINGS

The invention is explained in greater detail below with reference to drawings. Identical parts are provided with the same reference signs throughout. More particularly.

DESCRIPTION OF THE PREFERRED EMBODIMENTS

Figure 7:
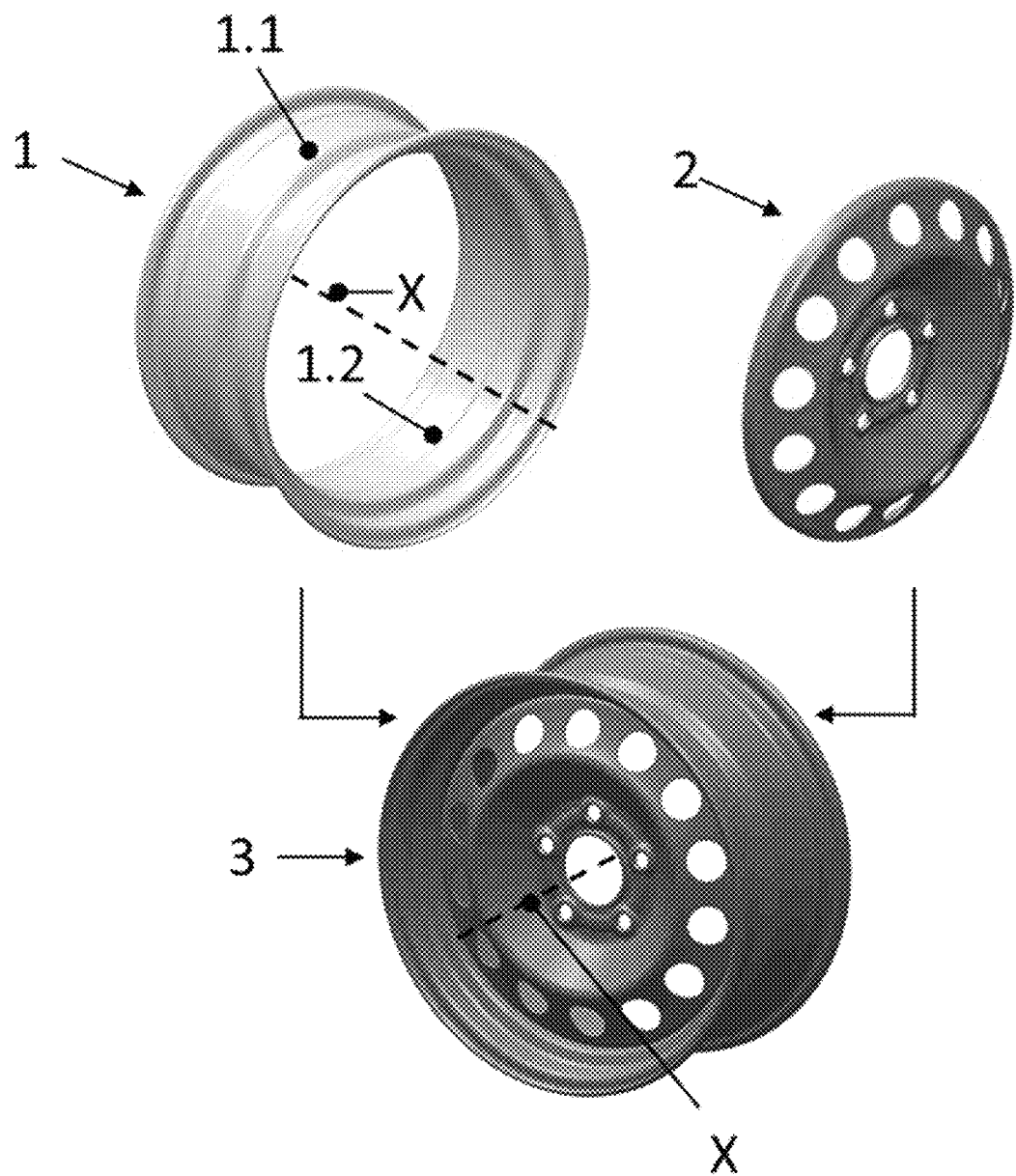
FIG. 7 shows a perspective view of a wheel rim, of a wheel disk and of an assembled vehicle wheel.

A vehicle wheel (3) comprises a wheel rim (1) for receiving a tire (not illustrated) and a wheel disk (2), which is attached by substance-to-substance bonding, non-positively and/or positively to the wheel rim (1) and has an attachment region for releasable mounting on a wheel carrier (not illustrated), FIG. 7. The vehicle wheel (3) can be designed for a passenger vehicle, wherein a material thickness of up to a maximum of 3 mm is preferably provided for the wheel rim (1), and a material thickness of up to a maximum of 6 mm is preferably provided for the wheel disk (2), or can be designed, in particular, for a commercial vehicle, wherein a material thickness of more than 3 mm is preferably provided for the wheel rim (1), and a material thickness of more than 6 mm is preferably provided for the wheel disk (2).

To produce a wheel rim (1) for a vehicle wheel (3), a semifinished product made of steel sheet is provided, which is produced in the form of a rotationally symmetrical and/or tubular and/or near-final contour preform of a wheel rim (not illustrated). In particular, the rotationally symmetrical and/or tubular and/or near-final contour preform of the wheel rim is produced from a flat sheet metal blank made of a hardenable steel material by means of cold forming, e.g. by profiling, and preferably has a rim well and/or hump and/or bead seat and/or rim flange, as well as a receiving region for a valve, which are/is at least close to the final contour (not illustrated). Selective thickness adaptation along the rim width, e.g. by flow forming, is likewise conceivable.

The preform of the wheel rim is heated or heated through by means of suitable means, e.g. in a continuous furnace, at least partially or completely, to a temperature of at least $A_{C1}$, preferably of at least $A_{C3}$, wherein the hot preform of the wheel rim is then hot formed, at least in some region or regions, and at least partially press hardened (not illustrated). Other means for heating, e.g. radiant, conductive, inductive, individually or in combination, can likewise be used.

Figure 1:
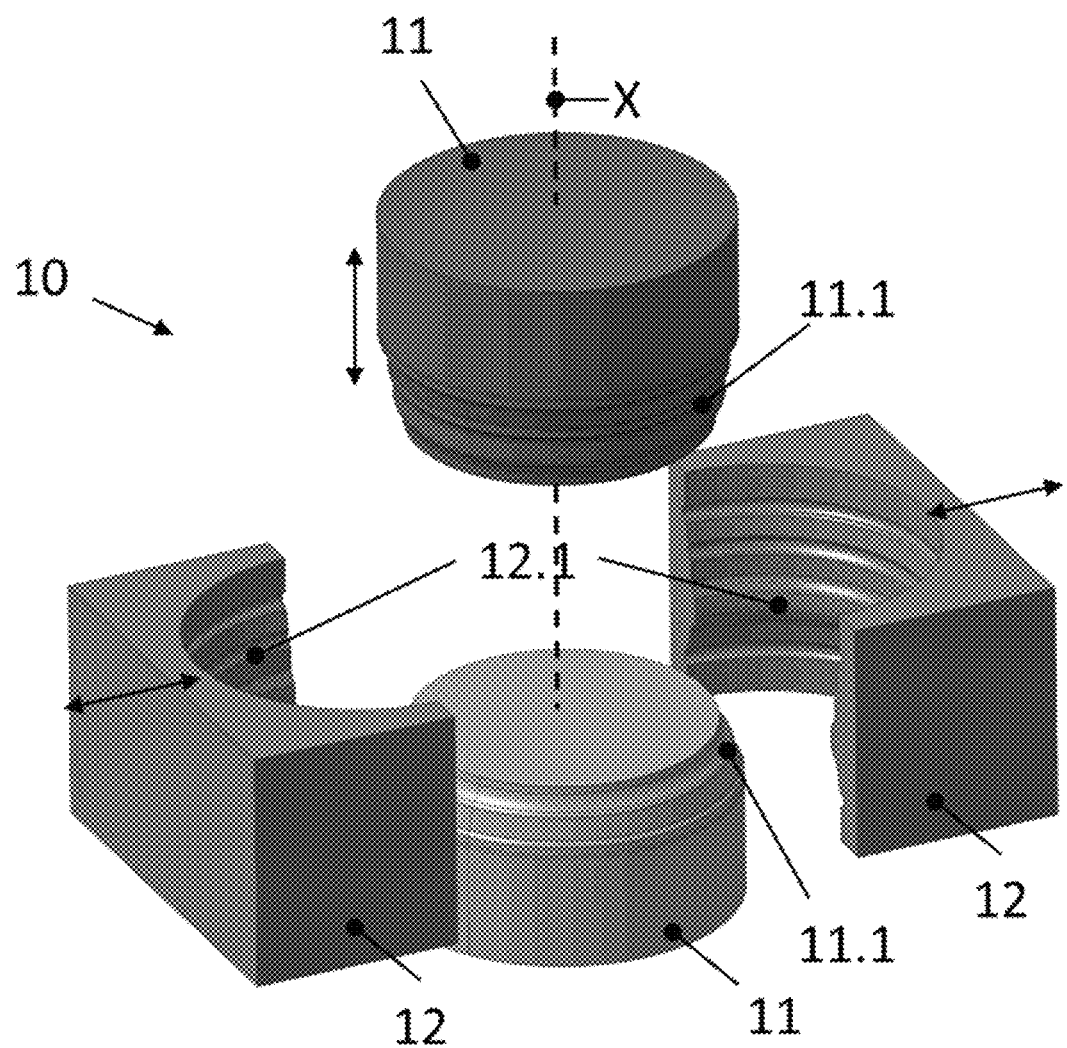
FIG. 1 shows a device in a perspective illustration in accordance with a first embodiment according to the invention.

A device (10) for producing a wheel rim (1) is shown in FIG. 1 in perspective illustration in accordance with a first embodiment according to the invention. The hot forming, at least in some region or regions, with at least partial press hardening of the hot preform of the wheel rim (not illustrated), is carried out in a device (10), wherein the device (10) has at least two inner dies (11) and at least two outer dies (12). At least in some region or regions, the outer dies (12) each have an effective area (12.1) which, at least in some region or regions, corresponds to the final geometry of the outer contour (1.1) of the wheel rim (1).

The hot preform of the wheel rim (not illustrated) is arranged between the outer dies (12) in the device (10), in particular being laid in the opened device (10), wherein, in particular, the first inner die (11), that shown at the bottom in FIG. 1, is designed in such a way that it can accommodate the preform of the wheel rim. In being arranged between the outer dies, the hot preform of the wheel rim is placed over the at least one, in particular the first, inner die (11), which is arranged between the outer dies (12) and is of rigid design, for example. Following on from this, the second inner die (11), which is arranged at the top in FIG. 1, in particular above the first inner die (11), is moved in translation in the direction of the inner die (11), in particular parallel to the axis of rotation (X) of the preform of the wheel rim, this being symbolized by the illustrated arrow, wherein, at least in some region or regions, the inner dies (11) each have an effective area (11.1) which, at least in some region or regions, corresponds to the final geometry of the inner contour (1.2) of the wheel rim (1).

Finally, the two outer dies (12) are moved in translation in the direction of or radially with respect to the axis of rotation (X) of the preform of the wheel rim, this being symbolized by the illustrated arrows, with the result that, when brought together, they can accommodate the wheel rim (1) along the outer contour (1.1) thereof, at least in some region or regions, in particular substantially completely. During this process, the preform of the wheel rim is converted to the final geometry of the outer contour (1.1) of the wheel rim (1) through the action of the effective areas (12.1) of the outer dies (12) on the outer contour of the preform of the wheel rim, is hot formed, at least in some region or regions, and is at least partially press hardened. Through interaction with the effective areas (11.1) of the inner dies (11), the preform of the wheel rim is received between the inner dies (11) and the outer dies (12), and a certain dimensional accuracy in the wheel rim (1) is established by at least partial press hardening. The at least partial press hardening, in particular the tool contact (11, 11.1, 12, 12.1), gives rise at least partially in the wheel rim (1) to a hardened structure by means of which it is possible to achieve a high dimensional accuracy through the avoidance of springback, as well as operational strength. The device can furthermore comprise means for the active and/or passive cooling of the at least one inner die (11) and/or of the at least one outer die (12) and/or means for direct fluid supply (not illustrated), in particular in order to avoid tool heating and to ensure at least partial press hardening of the wheel rim (1) and/or to allow hardening in one or more regions on the wheel rim (1) which are not in tool contact, for example, particularly during the production of a wheel rim (1) with undercut geometry.

After a predetermined time, in particular after a temperature has been reached, in particular when all the transformation processes (bainite and/or martensite) are substantially complete and the desired structure has been established in the wheel rim (1), in particular after the $M_f$ temperature has been reached, the device (10) is opened again, the tool components (11, 12) are once again moved apart or away, and the wheel rim can be removed and fed to further steps, e.g. an optional blasting treatment of the surface to remove any scale that may have formed on the wheel rim (1), and attachment to a wheel disk (2) to produce a vehicle wheel (3), with optional subsequent cathodic dip coating (CDC) to establish a predetermined corrosion protection.

Figure 2:
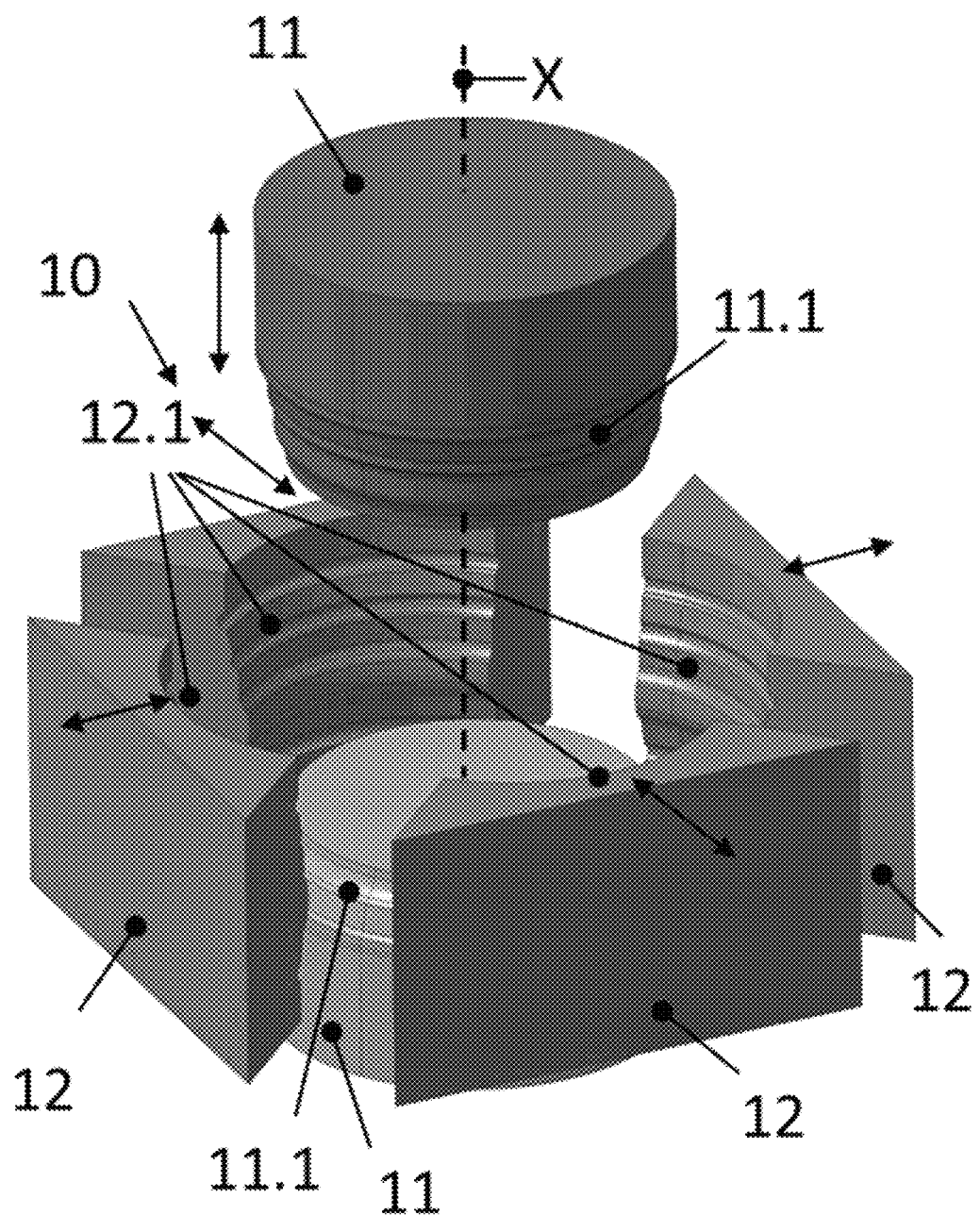
FIG. 2 shows a device in a perspective illustration in accordance with a second embodiment according to the invention.

FIG. 2 shows a device (10) for producing a wheel rim (1) in perspective illustration in accordance with a second embodiment according to the invention, wherein the device (10) or the process sequence correspond substantially to that in the first embodiment according to the invention in FIG. 1, with the difference that, instead of two, four outer dies (12) that can be moved in translation, this being symbolized by the arrows, are now provided in the device (10). The four outer dies (12) each surround one quarter of the outer contour (1.1) of the wheel rim (1). Better force distribution and surface pressure can thereby be achieved.

Figure 3:
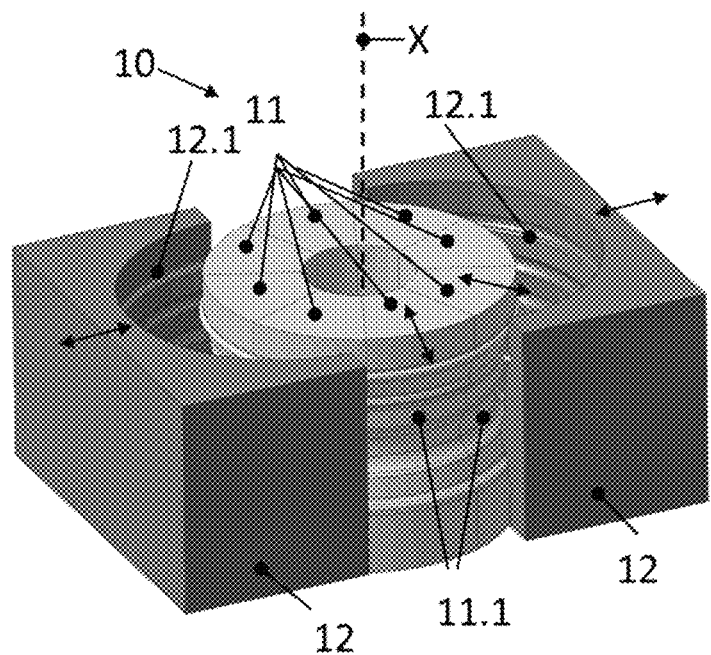
FIGS. 3 and 4 show a process sequence of a method for producing a wheel rim at different points in time with reference to the example of a device in perspective illustration in accordance with a third embodiment according to the invention.
Figure 4:
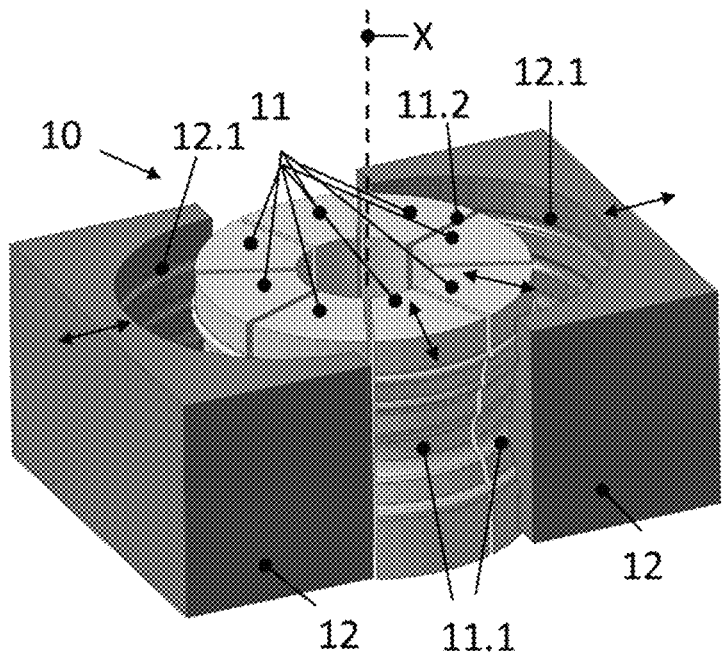

FIGS. 3 and 4 show a process sequence of a method for producing a wheel rim (1) at different points in time with reference to the example of a device (10) in perspective illustration in accordance with a third embodiment according to the invention. The hot forming, at least in some region or regions, with at least partial press hardening of the hot preform of the wheel rim, is carried out in a device (10), wherein the device (10) has at least two inner dies (11) and at least two outer dies (12). At least in some region or regions, the outer dies (12) each have an effective area (12.1) which, at least in some region or regions, corresponds to the final geometry of the outer contour (1.1) of the wheel rim (1).

In contrast to the two previous exemplary embodiments, the device (10) in the third exemplary embodiment comprises at least two, preferably at least three, four or more than four inner dies, in this example eight inner dies (11), wherein the inner dies (11) are embodied in such a way as to be movable in translation from a first position (FIG. 3) into a second position (FIG. 4), and the translational movement can be performed radially with respect to the axis of rotation (X) of the preform of the wheel rim or of the wheel rim (1). By virtue of the radial translational movement of the inner dies (11), it is also possible for undercut geometries on the wheel rim (1) or undercut regions on a wheel rim (1) to be cooled by means of tool contact (11, 11.1, 12, 12.1). In particular, this makes it possible for the device (10) to accommodate the wheel rim (1) in the closed state, at least in some region or regions, in particular substantially completely, and to substantially prevent distortion of the component.

The hot preform of the wheel rim is arranged between the outer dies (12) in the device (10), in particular being laid in the opened device (10), wherein the inner dies (11) are in the first position and, in being arranged between the outer dies (12), the hot preform can be placed at least in some section or sections over the at least one inner die, in particular over the eight inner dies (11), which are arranged between the outer dies (12), and there is substantially no contact with the inner dies (11) during the insertion of the preform in order to prevent uncontrolled premature cooling, e.g. cooling in some region or regions, of the hot preform of the wheel rim. At least in some region or regions, the inner dies (11) each have an effective area (11.1) which, at least in some region or regions, corresponds to the final geometry of the inner contour (1.2) of the wheel rim (1).

A translational movement of the inner dies (11) into the second position takes place at the same time as and/or with a time offset with respect to the translational movement and coming together of the outer dies (12) in order, at least in some region or regions, to make contact with and accommodate the preform of the wheel rim between the effective areas (11.1, 12.1), this taking place in opposite directions. By simultaneous action, as a preferred possibility, optimum dimensional accuracy of the wheel rim (1) can be brought about, with the two outer dies (12) and the eight inner dies (11) being moved in translation in the direction of the preform of the wheel rim or radially with respect to the axis of rotation of the preform of the wheel rim, this being symbolized by the illustrated arrows, thus enabling said dies, when brought together, to accommodate the wheel rim at least in some region or regions, in particular substantially completely, along the outer contour (1.1) thereof and at least in some section or sections along the inner contour (1.2) thereof. During this process, the preform of the wheel rim is converted to the final geometry of the inner and outer contour (1.1) of the wheel rim (1) through the action of the effective areas (11.1, 12.1) of the inner dies (11) and outer dies (12) on the inner and outer contour of the preform of the wheel rim, is hot formed, at least in some region or regions, and is at least partially press hardened. The at least partial press hardening, in particular the tool contact (11, 11.1, 12, 12.1), gives rise at least partially in the wheel rim (1) to a hardened structure by means of which it is possible to achieve a high dimensional accuracy through the avoidance of springback, as well as operational strength. The device (10) can furthermore comprise means for the active and/or passive cooling of the at least one inner die (11) and/or of the at least one outer die (12) (not illustrated). By virtue of the fact that, in the second position, the inner dies (11) are positioned spaced apart by the radial movement and define gaps (11.2) between them, it is possible if required to provide means for direct fluid supply (not illustrated), which can pass a fluid between the gaps (11.2), with the result that cooling of the regions on the wheel rim (1) which are not in contact with the effective areas (11.1) of the inner dies (11) is brought about by direct supply with a fluid, and hardening can take place.

After a predetermined time, in particular after a temperature has been reached, in particular when all the transformation processes (bainite and/or martensite) are substantially complete and the desired structure has been established in the wheel rim (1), in particular after the $M_f$ temperature has been reached, the device (10) is opened again, i.e. the outer dies (12) are once again moved apart or away and the inner dies (11) are moved into the first position thereof, i.e. the inner dies (11) and the outer dies (12) are moved away from one another in mutually opposite directions in order to release the wheel rim (1), thus enabling it to be removed and fed to further steps, e.g. an optional blasting treatment of the surface to remove any scale that may have formed on the wheel rim (1), and attachment to a wheel disk (2) to produce a vehicle wheel (3), with optional subsequent cathodic dip coating (CDC) to establish a predetermined corrosion protection.

The number of inner dies (11) is therefore not reduced to two. It is also possible, depending on the size and use of the wheel rim (1) or of the vehicle wheel (3) to be produced, to provide three, four or more than four inner dies (11), which can each be moved backward and forward in translation radially in the direction of the wheel rim (1) or radially with respect to the axis of rotation of the wheel rim (1) and allow an effective area designed to match the inner contour (1.2) of the wheel rim (1) in order to accommodate or support the wheel rim (1) during the at least partial press hardening. The eight inner dies (11) are each in contact with or press against one eighth of the inner contour (1.2) of the wheel rim (1). It is thereby possible to achieve better force distribution and surface pressure, in particular radially toward the outside, and also to reach undercut regions on the inner contour (1.2) of the wheel rim (1).

Figure 5:
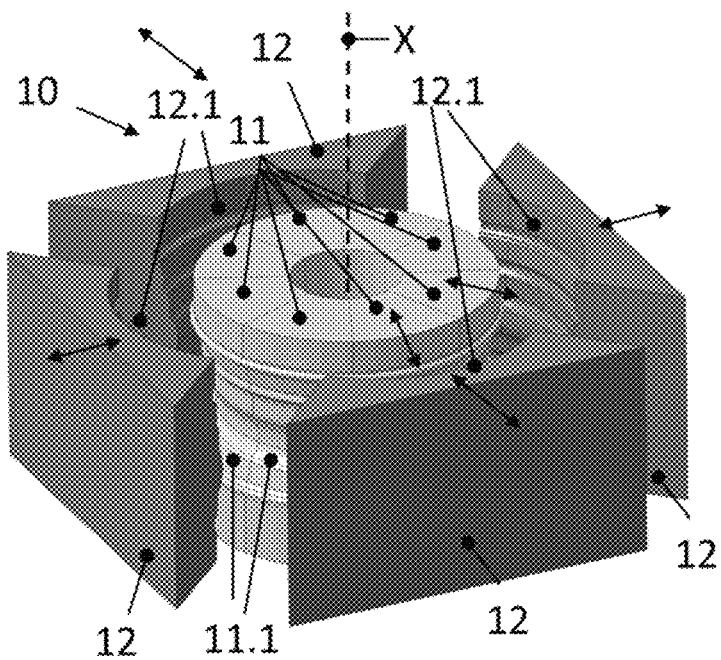
FIGS. 5 and 6 show a process sequence of a method for producing a wheel rim at different points in time with reference to the example of a device in perspective illustration in accordance with a third embodiment according to the invention.
Figure 6:
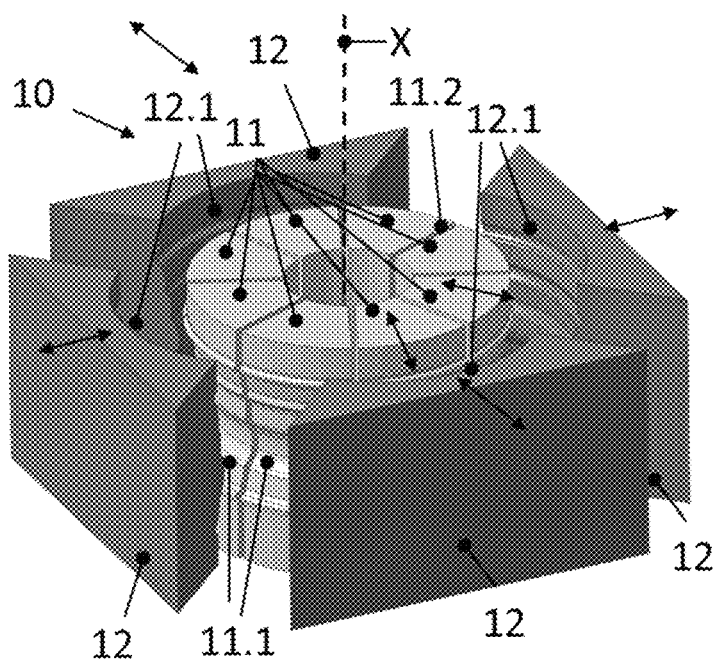

FIGS. 5 and 6 show a process sequence of a method for producing a wheel rim (1) at different points in time with reference to the example of a device (10) in perspective illustration in accordance with a fourth embodiment according to the invention. The embodiment of the device (10) in FIGS. 5 and 6 corresponds substantially to the embodiment of the device (10) in FIGS. 3 and 4 or to the process sequence, with the difference that, instead of two, four outer dies (12) that can be moved in translation, this being symbolized by the arrows, are provided in the device (10). The four outer dies (12) each surround one quarter of the outer contour (1.1) of the wheel rim (1). It is thereby possible to achieve better force distribution and surface pressure, in particular radially toward the inside.

FIG. 7 shows a perspective illustration of a wheel rim (1) produced according to the invention, and of a wheel disk (2), which are provided for the production of a vehicle wheel (3), illustrated in perspective. The wheel disk (2) can consist of a semifinished product made of steel sheet, which has been produced by cold forming and/or hot forming with at least partial press hardening. The wheel desk (2) is attached to the wheel rim (1) by substance-to-substance bonding, non-positively and/or positively to form a vehicle wheel (3). As a particular preference, attachment is accomplished by means of a press fit (nonpositive and/or positive engagement) in combination with a thermal joining method (substance-to-substance bonding), such as MAG or laser welding.

By means of the method according to the invention and by means of the device (10), it is possible to produce both vehicle wheels (3) for passenger vehicles and for commercial vehicles or other vehicles, e.g. agricultural machines, agricultural vehicles or military vehicles. The individual features shown in the respective exemplary embodiments may also be combined with one another. The wheel rim (1) may be completely or only partially press hardened, e.g. only regions such as the rim flange, the bead seat, the hump and/or the rim well. It is preferable if no press hardening takes place in a region of the wheel rim which is used, in particular, for at least substance-to-substance attachment to a wheel disk (2) in order to avoid formation of a softening zone during the production of a vehicle wheel, in particular during the substance-to-substance joining of the wheel disk (2) to the wheel rim. The wheel disk (2) may be press hardened either completely, partially or not at all.

The device (10) may furthermore also comprise means (not illustrated) for active and/or passive cooling of the individual tool components (11, 12) in order to ensure mass production without significant disruption, e.g. by tool components that become too hot, but especially also to cool the tool components (11, 12) in such a way that an at least partial hardened structure can be established in the wheel rim (1). The use of tailored products, particularly materials with adjusted thicknesses or semifinished products with a modified geometry, e.g. flow-formed blanks, tailored welded blanks, tailored rolled blanks etc., is also conceivable.

The vehicle wheels (3) produced are used in passenger vehicles, commercial vehicles, trucks, special vehicles, buses, omnibuses, agricultural machines, agricultural vehicles, military vehicles, whether with an internal combustion engine and/or an electric drive, towed vehicles, semitrailers or trailers.

The invention claimed is:

1. A method for producing a wheel rim for a vehicle wheel, comprising the following steps:
providing a semifinished product made of steel sheet; and
producing a wheel rim from the semifinished product that is at least one of rotationally symmetrical, tubular and near final contour preform, wherein the producing further comprises;
at least partial or complete heating of the preform of the wheel rim to a temperature of at least $A_{c1}$ and subsequent hot forming, at least in some region or regions, with at least partial press hardening, wherein the hot forming, at least in some region or regions, with at least partial press hardening is carried out in a device, wherein the device comprises at least two inner dies and at least two outer dies, wherein, at least in some region or regions, the inner dies define gaps therebetween, the inner dies each have an effective area which, at least in some region or regions, corresponds to the corresponding final geometry of the inner contour of the wheel rim, wherein, at least in some region or regions, the outer dies have an effective area which, at least in some region or regions, corresponds to the corresponding final geometry of the outer contour of the wheel rim, wherein the hot preform is arranged between the outer dies, and, by the action of the effective areas of the outer dies on the outer contour of the preform in a closed state, the preform of the wheel rim is converted into the final geometry of the outer contour of the wheel rim, hot formed, at least in some region or regions, and at least partially press hardened, wherein the at least partial press hardening of the preform of the wheel rim is additionally assisted during the at least partial press hardening by the use of a fluid, which is brought into direct contact with the hot preform of the wheel rim, wherein the fluid is directed between the gaps of the inner dies with the result that the cooling of the wheel rim occurs.

2. The method of claim 1 wherein the final geometry of the outer contour of the wheel rim includes an undercut geometry, wherein the fluid is brought into direct contact with the undercut geometry.

3. The method as claimed in claim 1, wherein, before, during or after the action of the effective areas of the outer dies on the outer contour of the preform of the wheel rim, the effective areas of the inner dies act on the inner contour of the preform of the wheel rim, wherein the preform of the wheel rim is in contact, at least in some region or regions, with the effective areas of the inner dies and outer dies in the closed state of the device.

4. The method as claimed in claim 3, wherein a hardenable steel material with a carbon content of at least 0.07% by weight, is provided as the semifinished product.

5. The method as claimed in claim 3 wherein a hardenable steel material with a carbon content of at least 0.10% by weight is provided as the semifinished product.

6. The method as claimed in claim 3 wherein a hardenable steel material with a carbon content of at least 0.15% by weight is provided as the semifinished product.

7. The method as claimed in claim 3, wherein, during the arrangement of the hot preform of the wheel rim between the outer dies, at least one of the inner dies is arranged between the outer dies, and the hot preform of the wheel rim is placed over the at least one inner die, at least in some section or sections.

8. The method as claimed in claim 7, wherein the device comprises two inner dies, and, after the arrangement of the hot preform of the wheel rim, the second inner die is moved in translation in a direction of the first inner die, wherein, in the closed state of the device, the preform of the wheel rim is in contact, at least in some region or regions, with the effective areas of the two inner dies.

9. The method as claimed in claim 7, wherein the device comprises at least two inner dies, wherein the inner dies are moved in translation from a first position into a second position, wherein a circumference of the effective areas of the inner dies is smaller in the first position than in the second position, wherein the inner dies are in the first position during the arrangement of the hot preform of the wheel rim, wherein, after the arrangement of the hot preform of the wheel rim, the inner dies are moved into the second position, and, in the closed state of the device, the preform of the wheel rim is in contact, at least in some region or regions, with the effective areas of the two inner dies.

10. The method as claimed in claim 9, wherein the translational movement of the inner dies into the second position takes place at the same time as and/or with a time offset with respect to the translational movement and coming together of the outer dies to make contact, at least in some region or regions, and accommodate the preform of the wheel rim between the effective areas.

11. The method as claimed in claim 9, wherein at least one region on the wheel rim which serves for bonding with a wheel disk, is not press hardened.

* * * * *